United States Patent
Jenkins

(10) Patent No.: US 7,478,364 B2
(45) Date of Patent: Jan. 13, 2009

(54) COMPUTER-IMPLEMENTED METHOD, SYSTEM AND PROGRAM PRODUCT FOR DETERMINING A MESSAGE QUANTITY FOR PROGRAM CODE

(75) Inventor: Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 10/681,908

(22) Filed: Oct. 9, 2003

(65) Prior Publication Data

US 2005/0081215 A1   Apr. 14, 2005

(51) Int. Cl.
*G06F 9/44* (2006.01)
*G06F 9/45* (2006.01)
*G06F 17/28* (2006.01)
*G06F 17/27* (2006.01)

(52) U.S. Cl. ........................ 717/110; 717/112; 717/136; 704/2; 704/3; 704/9; 714/38

(58) Field of Classification Search ........... 717/10–113, 717/136–137, 141–144; 704/1–10; 714/38
See application file for complete search history.

(56) References Cited

U.S. PATENT DOCUMENTS

| | | | |
|---|---|---|---|
| 3,959,431 A * | 5/1976 | Nissel | 264/173.12 |
| 4,872,167 A * | 10/1989 | Maezawa et al. | 714/38 |
| 5,287,444 A | 2/1994 | Enescu et al. | |
| 5,297,248 A * | 3/1994 | Clark | 345/440 |
| 5,909,570 A | 6/1999 | Webber | |
| 6,216,143 B1 * | 4/2001 | Ryan et al. | 715/234 |
| 6,256,676 B1 | 7/2001 | Taylor et al. | |
| 6,367,068 B1 * | 4/2002 | Vaidyanathan et al. | 717/143 |

(Continued)

OTHER PUBLICATIONS

W. R. Bush, J. D. Pincus and D. J. Sielaff. A Static Analyzer for Finding Dynamic Programming Errors. Software Practice and Experience, vol. 30, No. 7, pp. 775802, 2000.*

(Continued)

*Primary Examiner*—Lewis A. Bullock, Jr.
*Assistant Examiner*—Jason Mitchell
(74) *Attorney, Agent, or Firm*—A. Bruce Clay; Hoffman Warnick LLC

(57) ABSTRACT

Under the present invention, computer program code is analyzed to determine whether messages are needed. The analysis is typically conducted based upon a stored resource such as policies, rules, etc., and certain characteristics of the computer program code such as flags and the like. In any event, sections of the computer program code are then uniquely formatted according to the types of messages that are needed. Thereafter, a quantity of each needed type of message is determined based on the uniquely formatted sections. These results can be displayed to a developer and optionally saved to a file.

21 Claims, 3 Drawing Sheets

U.S. PATENT DOCUMENTS

| | | |
|---|---|---|
| 6,609,128 B1 | 8/2003 | Underwood |
| 7,000,185 B1 * | 2/2006 | Murren et al. ............... 715/536 |
| 7,024,365 B1 * | 4/2006 | Koff et al. ................. 704/270.1 |
| 7,127,704 B2 * | 10/2006 | Van De Vanter et al. .... 717/112 |
| 7,215,360 B2 * | 5/2007 | Gupta ......................... 348/180 |
| 2002/0120918 A1 | 8/2002 | Alzenbud-Reshef et al. |
| 2002/0147750 A1 * | 10/2002 | Kumhyr et al. ............. 707/530 |
| 2003/0131320 A1 * | 7/2003 | Kumhyr et al. ............. 715/536 |

OTHER PUBLICATIONS

D. Larochelle and D. Evans. Statically detecting likely buffer overflow vulnerabilities in USENIX Security Symposium, Washington, D. C., Aug. 2001.*

Fehily "SQL: Visual QuickStart Guide" 2002, Peachpit Press, Section Cummarizing and 'Grouping Data > counting Rows with Count' as downloaded from http://proquest.safaribooksonline.com/0321118030/ch06lev1sec1.*

* cited by examiner

COMPUTER-IMPLEMENTED METHOD, SYSTEM AND PROGRAM PRODUCT FOR DETERMINING A MESSAGE QUANTITY FOR PROGRAM CODE

This application is related in some aspects to co-pending U.S. application Ser. No. 10/681,910, filed Oct. 9, 2003 and entitled "Computer-Implemented Method, System and Program Product for Reviewing Message Associated with Computer Program Code," and to co-pending U.S. application Ser. No. 10/685,806, filed Oct. 15, 2003 and entitled "Computer-Implemented Method, System and Program Product for Analyzing Message Associated with Computer Program Code."

BACKGROUND OF THE INVENTION

1. Field of the Invention

The present invention generally relates to a computer-implemented method, system and program product for determining a message quantity for computer program code. Specifically, the present invention provides uniformity in determining the quantity and types of messages that are needed to adequately support computer program code.

2. Related Art

As computers continue to become more integrated in everyday life, computer software continues to become more sophisticated. For example, today a computer user can prepare a tax return, pay bills, purchase goods or services, etc., from the comfort of his/her personal computer. Such convenience is provided by various software packages. To this extent, computer program developers are constantly working to improve existing products, or introduce new products to the market.

In developing program code, a developer will typically include certain "messages" designed to support the product for the end-user. Typical messages that can be provided include error messages, warning messages and information messages. Although each of these messages serves a different purpose, they are usually necessary to fully support the program code being developed. Unfortunately, there is currently no uniformity in determining the quantity and types of messages that should be developed for computer program code. For example, within a single piece of program code, one properties file could contain 10 messages, while another could contain over 100. No one really knows what the correct quantity of messages should be, much less, what types of messages should be provided to support a certain amount of program code.

As a result of this disparity, program integrated information (PII) counts are usually inaccurate and highly inflated to try to accommodate some unknown number. This is especially problematic since translation between languages is often necessary for a program. Specifically, it is common for a software product to be made available in multiple countries/regions of the world. As such, lingual translation of interfaces, messages and the like is necessary. The more messages that are utilized to support a program, the greater the translation costs. Thus, with no real control or uniformity over message development, translation costs for a program can be substantial and unpredictable.

In view of the foregoing, there exists a need for a computer-implemented method, system and program product for determining a message quantity for computer program code. Specifically, a need exists for a system that can analyze computer program code and determine whether messages are needed (to support the computer program code). A further need exists for the system to be able to uniquely format different sections of the computer program code based on the message types corresponding thereto. A further need exists for a quantity to be determined for each message type that is determined to be needed for the computer program code.

SUMMARY OF THE INVENTION

In general, the present invention provides a computer-implemented method, system and program product for determining a message quantity for computer program code. Specifically, under the present invention, computer program code is analyzed to determine whether messages are needed. The analysis is typically conducted based upon a stored resource such as policies, rules, etc., and certain characteristics of the computer program code such as flags and the like. In any event, sections of the computer program code are then uniquely formatted according to the types of messages that are needed. For example, sections of computer program code needing an error message could be highlighted in the color red, sections needing a warning message could be highlighted in the color orange, while sections needing an information message could be highlighted in the color green. In any event, a quantity of each needed type of message is then determined based on the uniquely formatted sections. For example, the quantity of error messages that are needed is equal to the quantity of red sections. Once a quantity is determined for each type of message, the results can be displayed to a developer and optionally saved to a file.

A first aspect of the present invention provides a computer-implemented method for determining a message quantity for computer program code, comprising: providing computer program code; parsing and analyzing the computer program code to determine if display messages need to be inserted into the computer program code, wherein the display messages are desinned to support the computer program code during execution of the computer program code by providing information to an end-user of the computer program code, and wherein the messages include information messages not related to nerformance information; uniquely formatting sections of the computer program code based upon types of display messages determined to be needed by at least color-coding the sections wherein at least two types of unique message formatting are used; determining a quantity for each of the types of display messages by summing the uniquely color coded sections for each of the types of messages to provide the quality for each of the types of messages; and outputting the quantity.

A second aspect of the present invention provides a computerized system for determining a message quantity for computer program code, comprising: a processor; and a memory, the memory having: a program analysis system for parsing and analyzing the computer program code to determine if display messages need to be inserted into the computer program code, wherein the display messages are designed to support the computer program code during execution of the computer program code by providing information to an end-user of the computer program code, and wherein the messages include information messages not related to performance information; a program formatting system for uniquely formatting sections of the computer program code based upon types of display messages determined to be needed by the program analysis system by at least color-coding the sections wherein at least two types of unique message formatting are used; and a quantity determination system for determining a quantity for each of the types of display messages by summing the uniquely color coded sections for each of the types of messages to provide the quality for each of the types of messages and for outputting the quantity.

A third aspect of the present invention provides a program product stored on a recordable medium for determining a message quantity for computer program code, which when executed, comprises: program code for parsing and analyzing the computer program code to determine if display messages need to be inserted into the computer program code, wherein the display messages are designed to support the computer program code during execution of the computer program code by providing information to an end-user of the comPuter program code. and wherein the messages include information messages not related to performance information; program code for uniquely formatting sections of the computer program code based upon types of display messages determined to be needed by at least color-coding the sections wherein at least two types of unique message formatting are used; and program code for determining a quantity for each of the types of display messages by summing the uniquely color coded sections for each of the types of messages to provide the quality for each of the types of messages and for outputting the quantity.

Therefore, the present invention provides a method, system and program product for determining a message quantity for computer program code.

BRIEF DESCRIPTION OF THE DRAWINGS

These and other features of this invention will be more readily understood from the following detailed description of the various aspects of the invention taken in conjunction with the accompanying drawings in which.

Figure 1:
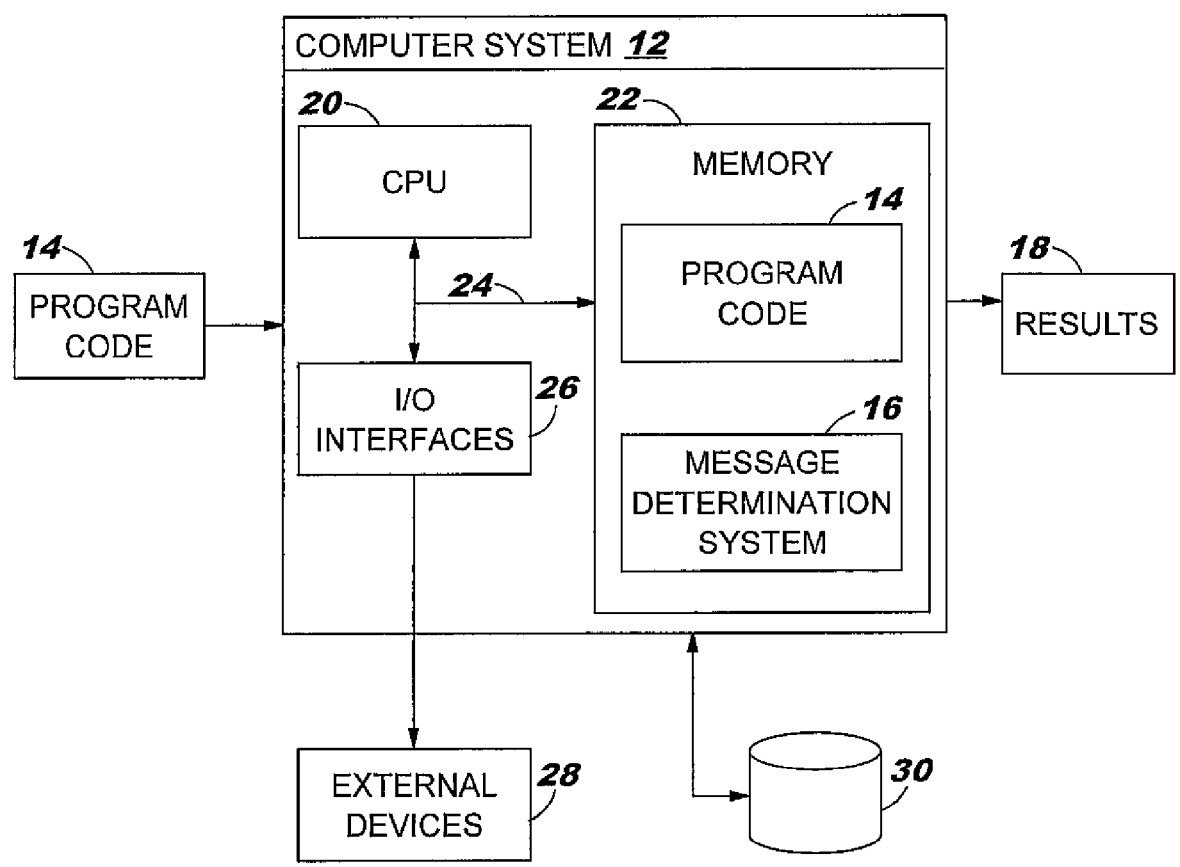
FIG. 1 depicts a computerized system for determining a message quantity for computer program code according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a computer-implemented method, system and program product for determining a message quantity for computer program code. Specifically, under the present invention, program code is analyzed to determine whether messages are needed. The analysis is typically conducted based upon a stored resource such as policies, rules, etc., and certain characteristics of the computer program code such as flags and the like. In any event, sections of the computer program code are then uniquely formatted according to the types of messages that are needed. For example, sections of computer program code needing an error message could be highlighted in the color red, sections needing a warning message could be highlighted in the color orange, while sections needing an information message could be highlighted in the color green. In any event, a quantity of each needed type of message is then determined based on the uniquely formatted sections. For example, the quantity of error messages that are needed is equal to the quantity of red sections. Once a quantity is determined for each type of message, the results can be displayed to a developer and optionally saved to a file.

Referring now to FIG. 1, a system 10 for determining a message quantity for program code is shown. As depicted, system 10 includes a computer system 12 that receives computer program code (hereinafter program code 14) such as that developed by a "developer" not shown in FIG. 1. As will be further described below, message determination system 16 is an executable program or the like that analyzes program code 14 to determine whether messages are needed, and if so, the quantity of each needed type of message. It should be understood that computer system 12 is intended to represent any type of computerized device capable of executing programs and performing the functions described herein. For example, computer system 12 could be a personal computer, a handheld device, a workstation, client, server, etc. In addition, computer system 12 could be implemented as a stand-alone system, or as part of a computerized network such as the Internet, local area network (LAN), wide area network (WAN), virtual private network (VPN), etc. In the case of the former, program code 14 could be provided to computer system 12 on a recordable medium such as a diskette or CD-ROM. In the case of the latter, program code 14 could be made available to computer system 12 over the network (e.g., via e-mail, file sharing, etc.). Furthermore, if implemented within a network, computer system 12 could represent a client or a server. As known, communication between clients and a server could occur via a direct hardwired connection (e.g., serial port), or via an addressable connection that may utilize any combination of wireline and/or wireless transmission methods. The server and the clients may utilize conventional network connectivity, such as Token Ring, Ethernet, WiFi or other conventional communications standards. Moreover, connectivity could be provided by conventional TCP/IP sockets-based protocol. In this instance, the clients could utilize an Internet service provider to establish connectivity to the server.

Regardless of its implementation, as shown, computer system 12 comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, handheld device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., database) capable of providing storage for information under the present invention. Such information could include, for example, stored resources such as rules, policies and the like for indicating when messages are needed for program code 14, files containing results of program code analysis, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Furthermore, although not shown, additional components, such as cache memory, communication systems, system software, etc., may be incorporated into computer system 12.

Figure 2:
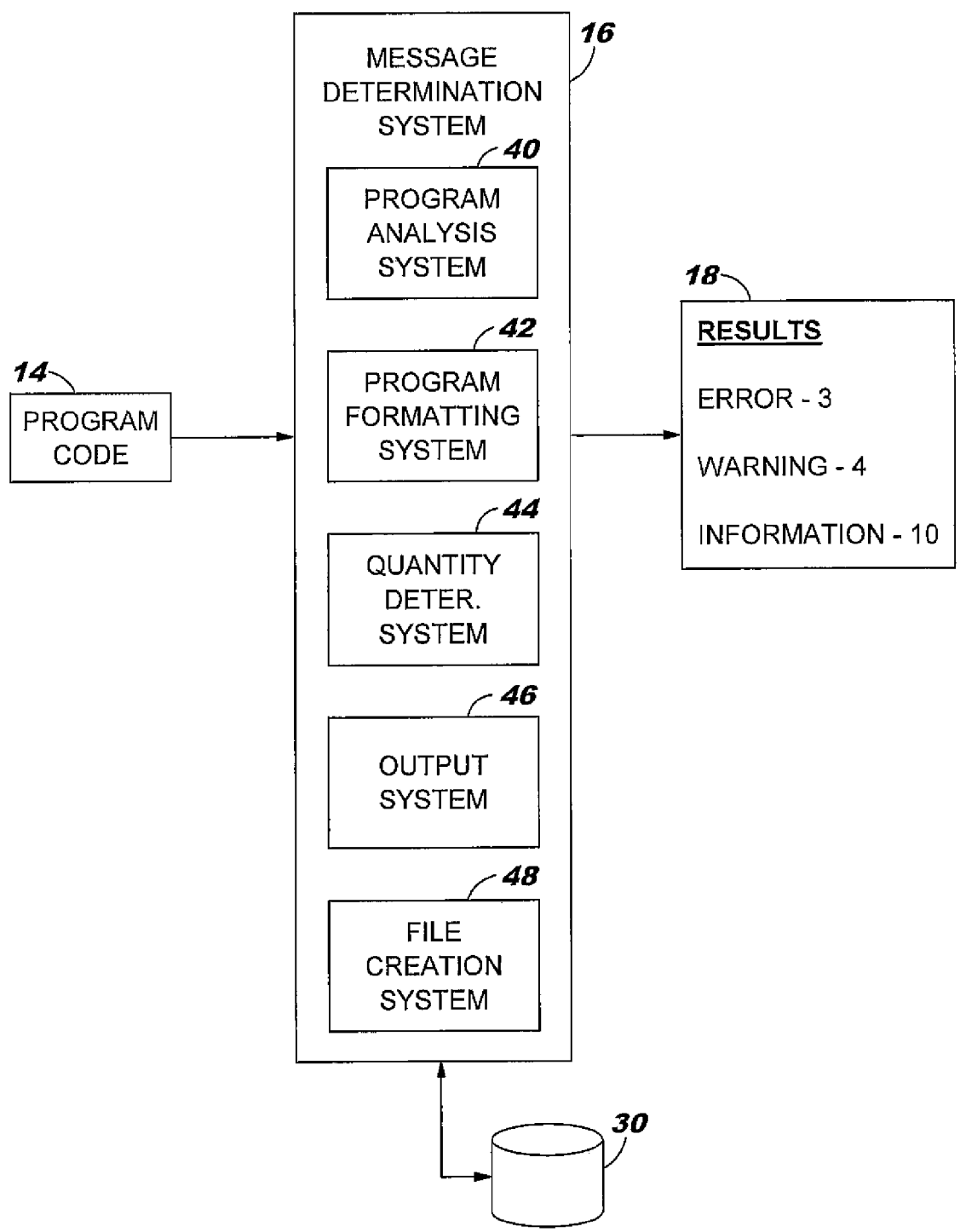
FIG. 2 depicts the message determination system of FIG. 1

As indicated above, once program code 14 is available, message determination system 16 will analyze it, and determine whether any messages are needed. If so, the quantity of each type of message that is needed is then determined. Referring now to FIG. 2, a more detailed diagram of message determination system 16 is depicted. In general, message determination system 16 is an executable program/file that is copied into whichever directory of computer system 12 (FIG. 1) that contains program code 14. However, it should be appreciated that this is only one embodiment for carrying out the present invention and other alternatives could be implemented within the scope of the present invention.

In any event, once program code 14 is available, program analysis system 40 will parse and analyze the same to determine what, if any, messages are needed to support program code 14. In general, there are at least three types of messages that are commonly needed to support a set of program code, namely, an error message, a warning message, and an information message. An error message is one that is displayed to an end user in response to an error condition such as an invalid input. A warning message is a message that warns an end-user of a particular circumstance. For example, if an end-user were purchasing a chemical, a warning message could be displayed that warns the end-user of storage and handling requirements. An information message is one that is displayed for an end-user for informational purposes only. For example, an information message could contain price and available quantity information for a good that an end-user wishes to purchase. It should be understood that the present invention is not limited to these three different types of messages. Rather, any type of message could be accommodated herein.

Regardless, program analysis system 40 can determine whether such messages are needed in a number of different ways. For example, program analysis system 40 can consult a stored resource in storage unit 30 that lists the situations in which program code 14 needs messages and which types. For example, the stored resource could contain rules, policies or the like that associate particular programming routines within program code 14 with certain types of messages. Program analysis system 40 could use this information to analyze program code 14. Still yet, program analysis system 40 could be configured to check program code 14 for certain developer created flags or indicators. For example, if the developer of program code 14 flagged an error condition, program analysis system 40 would detect this error condition and determine that an error message would be needed to support that section of program code 14. In any event, program analysis system 40 could comprise a set (e.g., one or more) of scripts with if-then statements based on .tr coding, coding contract, etc., that run against program code 14 flagging certain conditions.

Once the analysis is complete, program analysis system 40 could communicate to program formatting system 42 which sections need messages and what types of messages. Thereafter, program formatting system 42 will uniquely format sections of program code 14 based on the types of the messages that are needed. In one embodiment, program formatting system 42 will highlight each section of program code 14 that needs a message in a color that is selected based on the type of the message needed. For example, all sections of program code 14 needing an error message could be highlighted in the color red, sections needing a warning message could be highlighted in the color orange, while sections requiring an information message could be highlighted in the color green. Color is a highly effective way to format because it is readily visible to a developer. However, it should be understood that these colors are intended to be illustrative only and that any set of colors could be used. Further, it should be understood that highlighting in color is only one way to uniquely format sections of program code 14 based upon the types of messages needed. For example, sections needing an error message could be boldfaced, sections needing a warning message could be underlined, while sections needing an information message could be italicized. This type of formatting is useful for developers who experience color blindness. As such, the manner in which the sections are formatted is not intended to be limiting as long as they are uniquely formatted in different manners based on the types of messages needed.

Once any sections of program code 14 needing messages are formatted accordingly, quantity determination system 44 will determine a quantity of each of the types of messages needed based on the uniquely formatted sections. Specifically, quantity determination system 44 will sum or count each set of uniquely formatted sections to provide a total quantity for each type of message. For example, if three sections of program code 14 are highlighted in red, four sections are highlighted in orange, and ten sections are highlighted in green, that means that three error messages, four warning messages and ten information messages are needed to support program code 14.

Once these quantities are determined, they can be presented as results 18 to the developer via output system 46. Upon prompting by the developer, results 18 can be saved to a file or the like by file creation system 48 for sharing with others such as supervisors, etc.

Figure 3:
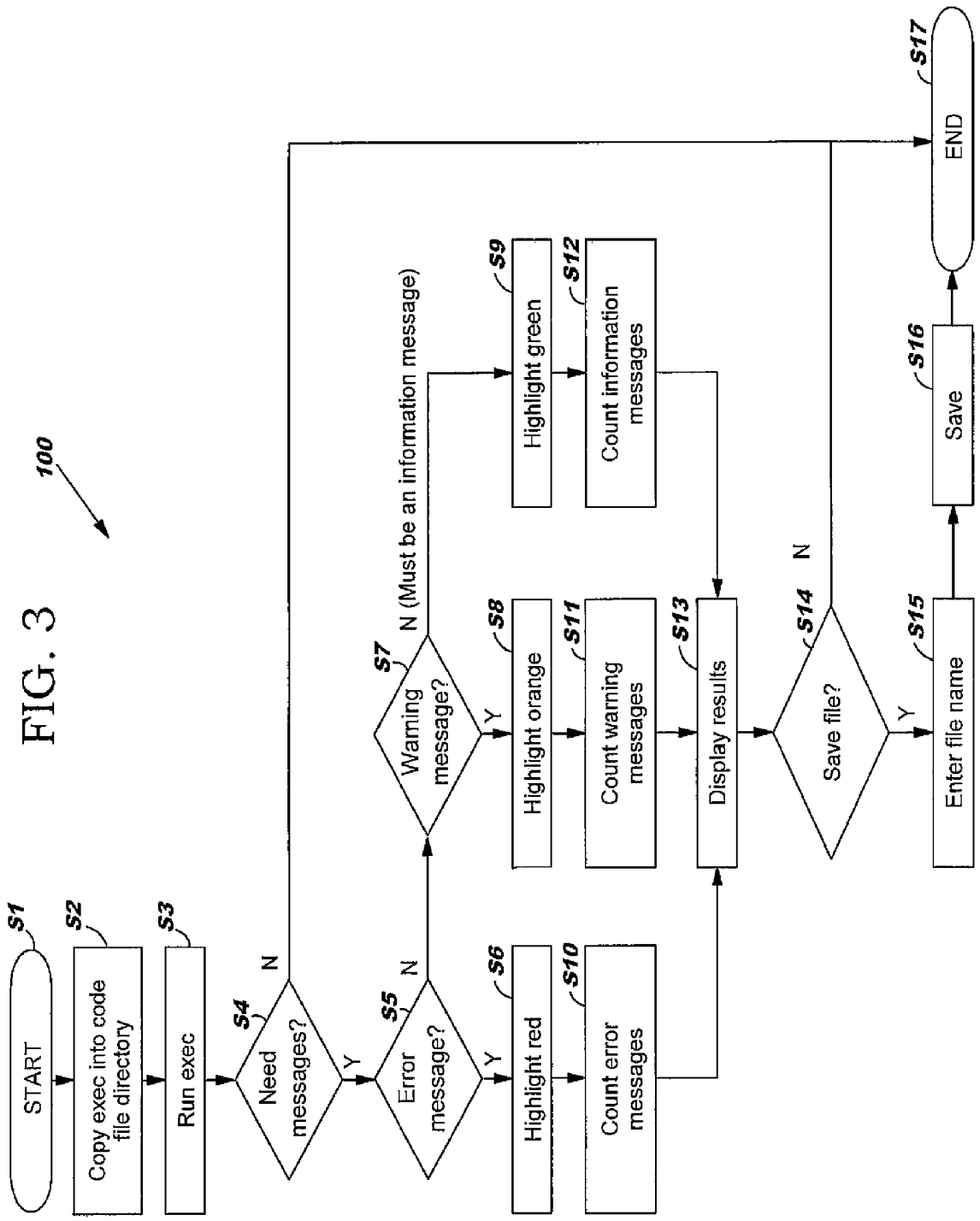
FIG. 3 depicts a method flow diagram, according to the present invention.

Referring now to FIG. 3, a method flow diagram 100 according to the present invention is depicted. As shown, the process is started in first step S1. In step S2, message determination system 16 (FIG. 1) is copied to the directory in which program code 14 is maintained. In step S3, message determination system 16 is run, and in step S4, it is determined whether messages are needed. As indicated above, this involves parsing program code 14 based on a saved resource or characteristic(s) of program code 14. If messages are not needed, the process is ended in step S117. If, however, messages are needed in step S4, the sections of program code needing messages are uniquely formatted based on the types of messages needed. Specifically, for each section of program code indicated as needing a message, it is determined whether the section needs an error message in step S5. If so, the section is highlighted in red (or otherwise formatted uniquely in a first manner) in step S6. If, however, the section did not need an error message, it is determined in step S7 whether the section needs a warning message. If so, the section is highlighted in orange (or otherwise uniquely formatted in a second manner) in step S8. If the section needed neither an error message nor a warning message, the message needed could be presumed to be an information message. In such a case, the section of program code is highlighted in green (or otherwise uniquely formatted in a third manner) in step S9. Once all sections needing messages have been formatted as appropriate, a count/quantity for each type of message will be determined in steps S10-S12. These counts can then be displayed as results in step S13. In step S14 it can be determined whether the results should be saved to a file. If not, the process is ended in step S17. If so, the file name is entered in step S15, the file is saved in step S16, and the process is then ended in step S17.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the present invention is not intended to be limited to the three different types of messages and associated ways to uniquely format discussed herein. For example, program code 14 could need 5 different types of messages. In this case, five different manners of uniquely formatting sections of program code 14 would be provided.

I claim:

1. A computer-implemented method for determining a message quantity for computer program code, comprising:
   providing computer program code;
   parsing and analyzing the computer program code to determine if display messages need to be inserted into the computer program code, wherein the display messages are designed to support the computer program code during execution of the computer program code by providing information to an end-user of the computer program code, and wherein the messages include information messages not related to performance information;
   uniquely formatting sections of the computer program code based upon types of display messages determined to be needed by at least color-coding the sections wherein at least two types of unique formatting are used;
   determining a quantity for each of the types of display messages by summing the uniquely color coded sections for each of the types of messages to provide the quantity for each of the types of messages; and
   outputting the quantity.

2. The method of claim 1, further comprising displaying the quantity for each of the types of messages.

3. The method of claim 1, further comprising saving the quantity for each of the types of messages.

4. The method of claim 1, wherein the uniquely formatting step comprises highlighting each section of the computer program code that needs a particular type of message in a unique color.

5. The method of claim 1, wherein the uniquely formatting step comprises:
   formatting the sections of the computer program code that require an error message in a first manner;
   formatting the sections of the computer program code that require a warning message in a second manner; and
   formatting the sections of the computer program code that require an information message in a third manner.

6. The method of claim 5, wherein the determining step comprises:
   determining a quantity of the sections of the computer program code formatted in the first manner;
   determining a quantity of the sections of the computer program code formatted in the second manner; and
   determining a quantity of the sections of the computer program code formatted in the third manner.

7. The method of claim 1, wherein the computer program code is analyzed based upon a stored resource and characteristics of the computer program code.

8. A computerized system for determining a message quantity for computer program code, comprising:
   a processor; and
   a memory, the memory having:
      a program analysis system for parsing and analyzing the computer program code to determine if display messages need to be inserted into the computer program code, wherein the display messages are designed to support the computer program code during execution of the computer program code by providing information to an end-user of the computer program code, and wherein the messages include information messages not related to performance information;
      a program formatting system for uniquely formatting sections of the computer program code based upon types of display messages determined to be needed by the program analysis system by at least color-coding the sections wherein at least two types of unique formatting are used; and
      a quantity determination system for determining a quantity for each of the types of display messages by summing the uniquely color coded sections for each of the types of messages to provide the quantity for each of the types of messages and for outputting the quantity.

9. The system of claim 8, further comprising an output system for displaying the quantity for each of the types of messages.

10. The system of claim 8, further comprising a file creation system for saving the quantity for each of the types of messages.

11. The system of claim 8, wherein the program formatting system highlights each section of the computer program code that needs a particular type of message in a unique color.

12. The system of claim 8, wherein the program formatting system:
   formats the sections of the computer program code that require an error message in a first manner;
   formats the sections of the computer program code that require a warning message in a second manner; and
   formats the sections of the computer program code that require an information message in a third manner.

13. The system of claim 12, wherein the quantity determination system:
   determines a quantity of the sections of the computer program code formatted in the first manner;
   determines a quantity of the sections of the computer program code formatted in the second manner; and determines a quantity of the sections of the computer program code formatted in the third manner.

14. The system of claim 8, wherein the computer program code is analyzed based upon a stored resource and characteristics of the computer program code.

15. A program product stored on a recordable storage medium for determining a message quantity for computer program code, which when executed, comprises:

program code for parsing and analyzing the computer program code to determine if display messages need to be inserted into the computer program code, wherein the display messages are designed to support the computer program code during execution of the computer program code by providing information to an end-user of the computer program code, and wherein the messages include information not related to performance information;

program code for uniquely formatting sections of the computer program code based upon types of display messages determined to be needed by at least color-coding the sections wherein at least two types of unique formatting are used; and program code for determining a quantity for each of the types of display messages by summing the uniquely color coded sections for each of the types of messages to provide the quantity for each of the types of messages and for outputting the quantity.

16. The program product of claim 15, further comprising program for displaying the quality for each of the types of messages.

17. The program product of claim 15, further comprising program code for saving the quantity for each of the types of messages.

18. The program product of claim 15, wherein the program code for uniquely formatting highlights each section of the computer program code that needs a particular type of message in a unique color.

19. The program product of claim 15, wherein the program code for uniquely formatting:

formats the sections of the computer program code that require an error message in a first manner;

formats the sections of the computer program code that require a warning message in a second manner; and formats the sections of the computer program code that require an information message in a third manner.

20. The program product of claim 19, wherein the program code for determining:

determines a quantity of the sections of the computer program code formatted in the first manner;

determines a quantity of the sections of the computer program code formatted in the second manner; and determines a quantity of the sections of the computer program code formatted in the third manner.

21. The program product of claim 15, wherein the computer program code is analyzed based upon a stored resource and characteristics of the computer program code.

* * * * *